United States Patent [19]

Ogasawara

[11] Patent Number: 4,892,103
[45] Date of Patent: Jan. 9, 1990

[54] ULTRASONIC SCANNING PULSE-GENERATING APPARATUS

[75] Inventor: Tatsuo Ogasawara, Tochigi, Japan

[73] Assignee: Kabushiki Kaisha Toshiba, Kawasaki, Japan

[21] Appl. No.: 300,697

[22] Filed: Jan. 19, 1989

Related U.S. Application Data

[63] Continuation of Ser. No. 188,146, Apr. 25, 1988, abandoned, which is a continuation of Ser. No. 925,922, Nov. 3, 1986, abandoned.

[30] Foreign Application Priority Data

Nov. 7, 1985 [JP] Japan ................................ 60-250042

[51] Int. Cl.⁴ .............................................. A61B 8/00
[52] U.S. Cl. .................................. 128/660.01; 73/620; 128/660.09
[58] Field of Search ...................... 128/660.01, 660.09, 128/660.10; 73/618–620, 633

[56] References Cited

U.S. PATENT DOCUMENTS

| | | | |
|---|---|---|---|
| 4,047,520 | 9/1977 | Soldner et al. | 73/620 X |
| 4,058,118 | 11/1977 | Stupay et al. | 128/690 |
| 4,141,347 | 2/1979 | Green et al. | 128/663 |
| 4,316,390 | 2/1982 | Kretz | 128/660 X |
| 4,317,370 | 3/1982 | Glenn | 128/660 X |
| 4,413,521 | 11/1983 | Van Kemenade | 128/660 X |

*Primary Examiner*—Francis Jaworski
*Attorney, Agent, or Firm*—Finnegan, Henderson, Farabow, Garrett & Dunner

[57] ABSTRACT

An ultrasonic scanning pulse-generating apparatus includes a rotary encoder for outputting a pulse every time a motor, driving an ultrasonic transducer, rotates through a predetermined angle, and a pulse cycle-measuring circuit for measuring the one-cycle period of pulses output from the rotary encoder. An address pulse output circuit is provided for outputting a pulse during each of the periods defined by dividing the one-cycle period by a predetermined number m. The address pulse output circuit is connected to a scanning pulse-generator including an address-forming circuit for constructing address data from the address pulse obtained by the address pulse output circuit, and a memory storing scanning pulse data and addressed by the address data of the address-forming circuit, to output a scanning pulse.

7 Claims, 3 Drawing Sheets

ULTRASONIC SCANNING PULSE-GENERATING APPARATUS

This application is a continuation of application Ser. No. 07/188,146, filed Apr. 25, 1988 now abandoned, which is a continuation of application Ser. No. 06/925,922, filed Nov. 3, 1986 and now abandoned.

BACKGROUND OF THE INVENTION

This invention relates to an ultrasonic scanning pulse-generating apparatus for use in ultrasonic imaging equipment of mechanical-scanning type.

An ultrasonic imaging device which performs mechanical scanning has an ultrasonic scanner including an ultrasonic transducer which is swingably moved, back and forth, to scan a subject, with an ultrasonic beam. The position of the transducer is detected by, for example, a rotary encoder. More precisely, it is detected from the rising edges of the pulses output by the rotary encoder. The rotary encoders available at present can output 300 to 600 pulses per revolution, but cannot produce more than this. The data showing the position of the transducer cannot serve by itself to generate rate pulses perfectly synchronous with the transmission and reception of the ultrasonic beam.

SUMMARY OF THE INVENTION

It is an object of the present invention to provide an apparatus for providing energizing pulses to an ultrasonic pulse transmitter, wherein the resolution of position information is improved by increasing the pulses output from a rotary encoder.

Another object of the invention is to provide an ultrasonic scanning pulse-generating apparatus, which can eliminate a deviation between the origin of motion of the transducer and the origin of a raster, i.e., the scanning start point.

According to the present invention, there is provided an ultrasonic scanning pulse-generating apparatus comprising a position detector coupled to a motor for swingably moving an ultrasonic transducer, for generating a rotation angle pulse every time the motor describes a predetermined arc; a pulse cycle-measuring circuit for measuring the one-cycle period of the rotation angle pulses output by the position detector; a pulse generator circuit for generating a divided pulse during each of the periods defined by dividing the one-cycle period by an integer; a circuit for counting the divided pulses output by the pulse generator circuit and determining, from the number of the divided pulses, the address data corresponding to the position of the ultrasonic transducer; and a scanning pulse generator circuit for generating scanning pulses corresponding to the address data.

DETAILED DESCRIPTION OF THE PREFERRED EMBODIMENT

Figure 1:
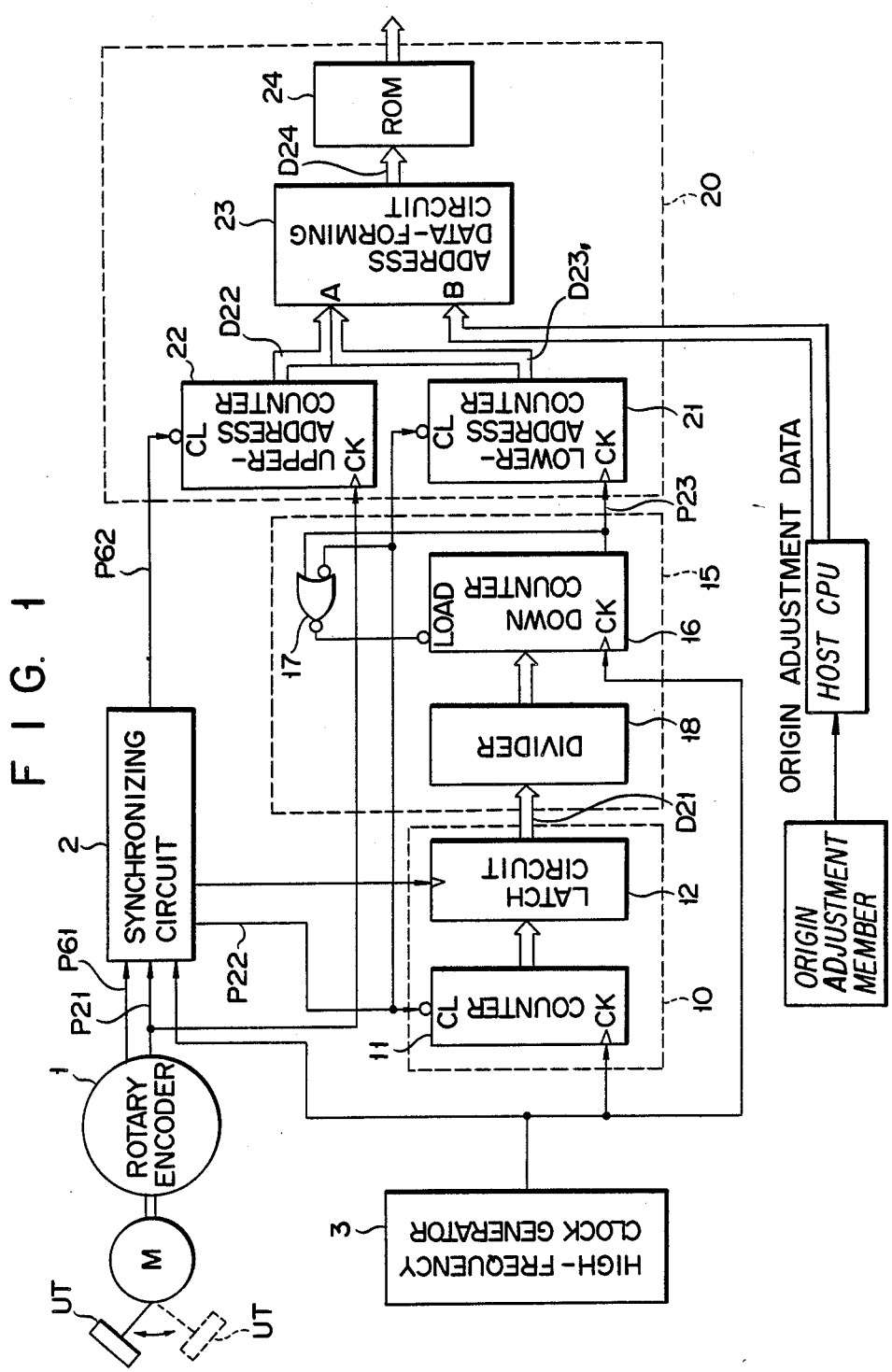
FIG. 1 is a block diagram of an ultrasonic scanning pulse-generating apparatus according to one embodiment of the invention.
Figure 2:
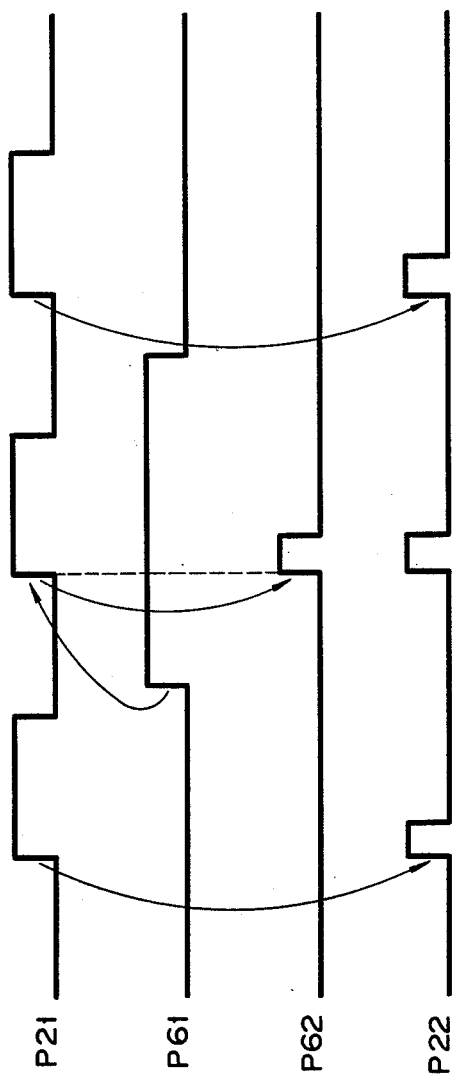
FIGS. 2 and 3 are timing charts illustrating when various signals are generated in the apparatus shown in FIG. 1.

As is shown in FIG. 1, rotary encoder 1, which acts as a position detector, is coupled to motor M for swingably moving ultrasonic transducer UT. Rotary encoder 1 generates one pulse every time motor M moves through a predetermined angle (e.g., 1.2°). The output terminals of rotary encoder 1 are connected to synchronizing circuit 2. High-frequency clock generator 3, which generates either one or the other of 4 MHz or 8 MHz pulses, has its output terminal connected to synchronizing circuit 2. Pulse cycle-measuring circuit 10 is provided, which comprises counter 11 and latch circuit 12. The output terminal of clock generator 3 is connected to clock terminal CL of counter 11. Clock terminal CL of counter 11 is coupled to the cycle pulse output terminal of synchronizing circuit 2. The output terminal of counter 11 is connected to latch circuit 12. Latch circuit 12 latches the count value of counter 11 immediately before counter 11 is cleared by a pulse output by circuit 2 during each one-cycle period.

Lower-address pulse output circuit 15 comprises down-counter 16 and divider 18. The output terminal of latch circuit 12 is coupled to divider 18. Divider 18 divides the count value held by latch circuit 12, by predetermined integer m. The output terminal of divider 18 is coupled to the input of down-counter 16. Down-counter 16 is preset at the value obtained by divider 18, and counts down the clock pulses from high-frequency clock generator 3, to output position information. The output terminal of counter 16 is connected to gate circuit 17 which in turn is coupled to load terminal LOAD of counter 16.

The apparatus further has scanning pulse generator 20. This generator comprises lower-address counter 21, upper-address counter 22, address data-forming circuit 23, and ROM 24. The output terminal of down-counter 16 is coupled to clock terminal CK of lower-address (lower-digit) counter 21. Lower-address counter 21 is cleared by a cycle pulse from synchronizing circuit 2. Upper-address (upper-digit) counter 22 has clock terminal CK coupled to the output terminal of rotary encoder 1, and CLEAR terminal CL connected to the output terminal of synchronizing circuit 2.

The output terminals of address counters 21 and 22 are connected to input terminal A of address data-forming circuit 23. Origin-adjustment data is supplied to input terminal B of circuit 23. Origin-adjustment data is used to make the origin of rotary encoder 1, i.e., the starting point of rotation thereof, coincide with the origin of the ultrasonic transducer, i.e., the starting point of motion thereof. Therefore, this adjustment of the origin of encoder 1 is necessary. When the ultrasonic transducer swings to the left and to the right, in order to perform sector scanning, the origin of the transducer deviates from the origin of the raster. More precisely, the maximum left or right moving position of the transducer deviates from, for example, the first scanning line of the raster. Due to this deviation, an incorrect image will be formed on a monitor screen.

To eliminate this deviation, the operator operates an origin-adjusting member while looking at the image on the monitor screen. Then, a host CPU supplies the origin-adjustment data to address data-forming circuit 23.

The output terminal of address data-forming circuit 23 is coupled to ROM 24. ROM 24 stores the scanning pulse data corresponding to all positions that transducer UT passes through as it swings to perform sector scanning. Each discrete angle of transducer UT (0.6, 1.2, 1.8, ...) is stored with an associated scanning pulse data, i.e., a raster scan line number. Each scan line may have more than one angle associated therewith. For example, this data corresponds to 512 scanning lines along which transducer UT scans the subject every time motor M rotates 360°. Motor M and transducer UT are coupled to each other such that transducer UT swings back and forth every time motor M rotates 360°. Motor M rotates at decreasing speed as transducer UT approaches the leftmost or rightmost position from the center position, and rotates at increasing speed as transducer UT approaches the center position from the leftmost or rightmost position.

When motor M rotates, ultrasonic transducer UT performs ultrasonic scanning on a subject. Rotary encoder 1 generates one rotation angle pulse P21 every time motor M moves through a predetermined angle, and produces one origin pulse P61 every time motor M rotates 360°.

Synchronizing circuit 2 outputs pulses P62 at the rising edges of rotation angle pulses P21 generated during the duration of each origin pulse P61. Circuit 2 also outputs pulses P22 at the rising edges of pulses P21. Hence, one pulse P22 is generated when each rotation angle pulse P21 is produced.

Figure 3:
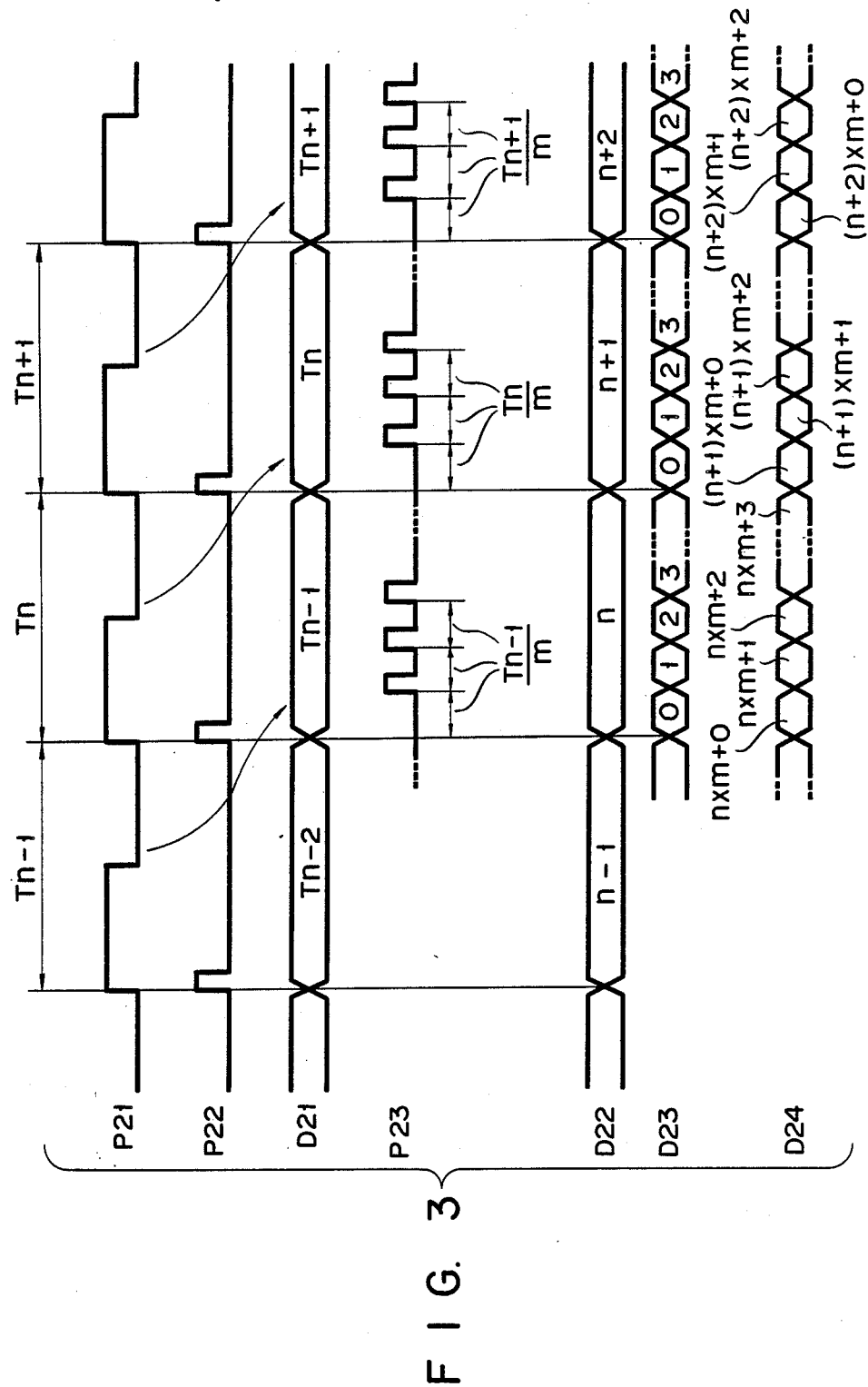

Upper-address counter 22 counts the pulses supplied from rotary encoder 1, and is cleared by pulse P62. Counter 11 counts clock pulses from pulse generator 3, and is cleared by pulse P22. In other words, counter 11 counts clock pulses so as to accumulate a count representative of the most recent interval between rotation angle pulses P21, i.e., duration of cycles $T_{n-1}$, $T_n$, $T_{n+1}$ (FIG. 3). The count value of counter 11 is input to latch circuit 12. Latch circuit 12 holds count value T, which counter 11 held immediately before being cleared at the end of cycle $T_{n-1}$, for the period of next cycle $T_n$. The data (D21) held by latch circuit 12 is input to divider 18.

Divider 18 divides data D21 (i.e., count value T) by m. Therefore, when high-frequency clock generator 3 generates clock pulses of 8 MHz, motor M rotates 12 times per second, and rotary encoder 1 generates 300 pulses P21 every time it rotates 360°, count value T is about 2222. If m is 64 in this instance, value T/m, i.e., 35, is loaded into down-counter 16. When $T=T_{n-1}$ (FIG. 3), value $T_{n-1}/m$, e.g., 35, is loaded into down-counter 16.

The load signal supplied to down-counter 16 is output by gate circuit 17, when pulse P22 is at "1" level and the output of counter 16 is at "0" level.

The value of 35, loaded in counter 16, is counted down one by one. Counter 16 supplies output pulses P23 to clock terminal CK of lower-address counter 21. When the count value of down-counter 16 is reduced to zero, gate circuit 17 supplies the load signal to load terminal LOD of down-counter 16. Then, the output data from divider 18 is loaded into down counter 16. Thereafter, the operations described above are repeated. The output of down-counter 16 becomes zero at the frequency of $T_{n-1}/m$. When this "zero" output of down-counter 16 is supplied as a clock signal to lower-address counter 21, down counter 16 will output pulses P23 (FIG. 3). Therefore, one pulse is obtained for each of the periods defined by dividing one-cycle period $T_{n-1}$ by m during the following one-cycle period $T_n$.

The 6-bit lower address counter (21) provided in scanning pulse generating circuit 20 counts up one each time it receives count value 0, of down-counter 16, at its clock terminal CK, and is cleared when synchronizing pulse P22 comes to have the value of 1, thereby forming lower-address data D23. Counter 21 stops when its count value reaches (m−1) and remains at rest until it is cleared. Therefore, lower-address data D23 changes from 0 to (m−1) during every one-cycle period of rotary angle pulses P21. When $T_{n-1}$ is longer than $T_n$, lower-address data D23 can be less than (m−1).

Upper-address counter 22 is cleared by synchronizing pulse P62 and counts pulses P21, thereby forming upper-address data D22. Upper-address data D22 and lower-address data D23 are combined to form address data for ROM 24. Data D22 represents the serial number of the cycle (or the serial number of rotary angle pulse P21), and data D23 represents the angle sub-increment obtained by dividing by m, the angle through which motor M rotates during the one sub-increment of the cycle period of pulse P21. Hence, when data D22 and data D23 are "100" and "30," data D23 represents one of the divided pulses obtained during the one-cycle period of pulse P21 corresponding to 100th cycle-period or increment of a single rotation of motor M.

Address data-forming circuit 23 combines upper address data D22 and lower address data D23, and uses origin-adjustment data, thereby forming address data D24. For instance, circuit 23 forms data D24, $n \times m + k$ (k=0 to m−1). Each address data D24 shows an angle given by dividing the rotation angle corresponding to pulse 21, and is used as position information to increase imaging resolution m times. Since lower-address counter 21 cannot count m or more, data, $n \times m + k$, remains unchanged, even if $T_{n-1}$ is longer than $T_n$. When $T_{n-1}$ is shorter than $T_n$, the count value of counter 21 becomes m−1 or less, and the number of data D23 pieces are decreased in number. The difference between m and the number of data D23 pieces is, in most cases, negligibly small. Since the divided pulses given by dividing the preceding one-cycle period are used to provide address data D23, data D23 cannot change greatly due to an irregular rotation, if any, of motor M. Consecutive cycles $T_{n-1}$ and $T_n$ do not differ largely due to an irregular rotation of motor M. Hence, address data D23 is very reliable.

This reliable address data, D23, designates an address of ROM 24, whereby the scanning data accurately corresponding to the raster scanning lines is read from ROM 24.

What is claimed is:

1. An apparatus for providing energizing pulses to an ultrasonic pulse transducer, comprising:
   position-detecting means coupled to a rotating motor for swingably moving an ultrasonic transducer, for generating a predetermined number of rotation angle pulses every time the motor rotates 360 degrees;
   pulse cycle-measuring means for measuring a one-cycle period (T) of the rotation angle pulses output from the position-detecting means;
   pulse-generating means, including means for dividing the one-cycle period (T) by a predetermined integer (m), for generating a plurality of divided pulses corresponding to a value obtained by said dividing means;
   counting means for counting the divided pulses output from the pulse-generating means, to output count data; and
   scanning pulse-generating means for generating scanning pulses corresponding to the count data.

2. An apparatus according to claim 1, wherein said dividing means of said pulse-generating means includes means for dividing the preceding one-cycle period by a predetermined integer to obtain a plurality of sub-periods, and wherein said pulse-generating means includes means for generating, during a one-cycle period of the rotation angle pulses, a pulse in each of the sub-periods obtained by said dividing means.

3. An apparatus according to claim 1, wherein said pulse cycle-measuring means comprises a clock generator means for generating clock pulses, a counter means for counting the clock pulses generated in each one-cycle period of repetitive pulses output from said position-detecting means, and a latch circuit means for latching the count value of the counter means, immediately before the next one-cycle period.

4. An apparatus according to claim 1, wherein said counting means comprises an upper-digit counter means for counting the repetitive pulses output from said position-detecting means, and for outputting an upper-digit count value, a lower-digit counter means for counting the output pulses of said pulse-generating means, and for outputting a lower-digit count value, and means for combining the upper-digit count value and the lower-digit count value to thereby form said count data.

5. An apparatus according to claim 1, wherein said scanning pulse-generating means comprises memory means for storing scanning line position data corresponding to a plurality of scanning lines, and address data-forming means for forming address data, from the count data from said counting means, said address data designating an address of said memory means, and for reading out the corresponding one of said scanning line position data.

6. An apparatus according to claim 5, further including data-input means for inputting origin-adjustment data corresponding to the origin of said ultrasonic transducer to said scanning pulse generating means, and wherein said scanning pulse-generating means includes address data-forming means for constructing the address data, by combining the count data output from said counting means with origin-adjustment data from said external data-input means, to cancel out the displacement of an origin of said position-detecting means with respect to an origin of said ultrasonic transducer.

7. An apparatus according to claim 1, wherein said position-detecting means comprises a rotary encoder means connected to said motor for driving said ultrasonic transducer, to generate the repetitive pulses while said motor is rotating.

* * * * *